United States Patent [19]

Trutnev et al.

[11] 4,213,931
[45] Jul. 22, 1980

[54] PROCESS OF MANUFACTURING GYPSUM PRODUCTS

[76] Inventors: Viktor A. Trutnev, ulitsa letchika Babushkina, 31, kv. 233, Moscow; Vitaly I. Zlobin, ulitsa Koltsevaya, 13, kv. 72, Lobnya Moskovskoi oblasti; Valentin K. Kushnarenko, ulitsa Semashko, 34, kv. 6, Rostov-na-Donu; Valentin B. Ignatov, ulitsa M.Gorkogo, 70, kv. 151, Rostov-na-Donu; Boris V. Gannota, ulitsa Semashko, 25, kv. 34, Rostov-na-Donu; Nikolai S. Ambartsumyan, ulitsa Sedova, 94, Rostov-na-Donu; Boris B. Volovik, ulitsa Pushkinskaya, 137/50, kv. 15, Rostov-na-Donu, all of U.S.S.R.

[21] Appl. No.: 900,020

[22] Filed: Apr. 25, 1978

[51] Int. Cl.$^2$ .................................................. C04B 11/00
[52] U.S. Cl. ..................................... 264/234; 106/109; 264/235; 264/237; 264/348
[58] Field of Search ............... 264/234, 235, 237, 333, 264/346, 348; 106/109, 110

[56] References Cited

U.S. PATENT DOCUMENTS

| | | | |
|---|---|---|---|
| 3,311,516 | 3/1967 | Jaunarajs et al. | 106/110 |
| 3,870,538 | 3/1975 | Burkard et al. | 106/109 |
| 3,906,083 | 9/1975 | George | 106/109 |
| 3,957,522 | 5/1976 | Matsuo et al. | 264/333 |

FOREIGN PATENT DOCUMENTS

| | | | |
|---|---|---|---|
| 62785 | 10/1940 | U.S.S.R. | 106/110 |
| 502853 | 7/1976 | U.S.S.R. | 106/110 |

*Primary Examiner*—Donald J. Arnold
*Attorney, Agent, or Firm*—Fleit & Jacobson

[57] ABSTRACT

In manufacturing gypsum products, crushed natural dihydrous gypsum $CaSO_4.2H_2O$ is molded and heat-treated in air at temperatures ranging from 100° to 200° C. The temperature is raised to a required level at a rate of 2 to 3 degrees per minute. The products are strengthened by watering.

The end gypsum products feature a water absorption of 7 to 10% and a frost resistance of 40 to 50 cycles. Their compression strength is 170 to 300 kg/cm$^2$.

6 Claims, No Drawings

PROCESS OF MANUFACTURING GYPSUM PRODUCTS

The present invention relates to construction materials, and more particularly to processes of manufacturing gypsum products.

The invention will find application in the manufacture of facing titles for exterior and interior finishing of buildings, as well as architectural and finishing elements in construction.

BACKGROUND OF THE INVENTION

In the current practice of manufacturing gypsum products, used as the basic raw material is hemihydrate gypsum $CaSO_4.0.5H_2O$ of construction grade, produced at specialized plants. To obtain this type of gypsum, natural gypsum stone ($CaSO_4.2H_2O$) is crushed and ground to powder in ball mills. Then in special boilers, the crushed and ground gypsum stone is heat-treated with mixing at a temperature of up to 180° C. for 4 to 8 hours. After cooling, the gypsum is packed and, protected against moisture, sent to a gypsum product manufacturing facility.

When hemihydrate gypsum $CaSO_4.0.5H_2O$ is used for manufacturing construction products, it is subjected to watering a few minutes before filling molds (the weight water to gypsum ratio being 0.4–0.6). It takes 5 to 15 minutes for gypsum to cure in a mold. After separation from the mold, the product is dried at a temperature of 50° to 60° C. for 8 to 16 hours, depending on the product's size.

All products so manufactured feature high porosity and hygroscopicity and, therefore, can be used only for interior work (partitions, floor tiles, decorative and sound absorbing panels). Moreover, the known process is complicated for it requires use of a starting material specially prepared in advance.

Also known is a process of manufacturing gypsum products, comprising crushing and grinding of gypsum stone-natural dihydrous gypsum $CaSO_4.2H_2O$—to grains with a specific surface of 2,500 to 2,800 $cm^2/g$, with subsequent mixing of the ground gypsum stone with water in amounts at which the weight water to gypsum ratio is 0.1–0.2. Then, the resulting mixture is poured into a mold, and products are formed. To compact the mixture, vibration is used. The molded products are subjected to hydrothermal treatment in water steam at a pressure of 7 to 7.5 atm. This hydrothermal treatment is carried out in an autoclave where dihydrous gypsum is dehydrated to a hemihydrate. For subsequent strengthening of the products by hydration they are immersed in water till saturation is reached (cf. USSR Inventor's Certificate No. 502,853).

This process is disadvantageous in that the mixture being molded is highly humid, which, in combination with the subsequent hydrothermal treatment, results in products featuring a porous structure with a water absorption of 18 to 20% and a low frost resistance of 10 to 15 cycles (by one cycle is meant freezing to a temperature of −15 to −20° C. for 4 hours, followed by de-freezing in water for 4 hours). In addition, resorting to heat treatment in an autoclave which is a batch-type piece of equipment does not permit manufacturing gypsum products in an assembly line process, nor does it allow the process as a whole to be automated.

There is known still another process of manufacturing gypsum products, disclosed in USSR Inventor's Certificate No. 62,785. According to this process, crushed and ground natural dihydrous gypsum $CaSO_4.2H_2O$ with a possible presence of fillers is humidified to 6–10% if the products are to be made by pressing or compaction; in the case where the products are made by molding or vibration, the batch is humidified by adding a large quantity of water to attain a plastic consistency. The products molded in one fashion or another are then subjected to hydrothermal treatment, for which purpose they are placed in an autoclave with water steam being supplied thereto at a pressure of at least 1 atm. The treatment under pressure continues for 3 to 6 hours. According to the above-cited Inventor's Certificate, as dihydrous gypsum is transforming to a hemihydrate, even at low pressures (1 to 1.5 atm) it recrystallizes with cogesive forces appearing between the hemihydrate crystals, which renders products much stronger directly in the course of the hydrothermal treatment. Then, the water steam is slowly released. After the hydrothermal treatment and cooling, the hemihydrate gypsum in the products is hydrated due to the water remaining in pores, whereby the products are additionally strengthened.

This process suffers from the same disadvantages inherent in the one described previously. It should be noted that products manufactured according to the above processes, by molding batches of a plastic consistency (the weight water to gypsum ratio being above 0.1), simply cannot feature improved frost and water resistance. When products molded by pressing are hydrothermally treated in an autoclave with steam, it is impossible to attain to porosity of less than 14–15% and the required frost resistance (35 cycles and above).

SUMMARY OF THE INVENTION

It is an object of the present invention to obviate the above disadvantages.

The principle object of the invention is to provide a process of manufacturing gypsum products, that will enable the water and frost resistance of the end products to be improved.

These objects are attained by that, in a process of manufacturing gypsum products, comprising molding of crushed and ground natural dihydrous gypsum $CaSO_4.2H_2O$ with subsequent heat treatment and strengthening of the molded products, according to the invention, said heat treatment of the molded products is carried out in air at temperatures ranging from 100° to 200° C., the temperature being raised to the required level at a rate of 2 to 3 degrees per minute, whereafter the heat-treated products are cooled to a temperature not exceeding 50° C., and strengthened by watering.

The proposed process has made it possible to make gypsum products with the following characteristics unusual for gypsum products in general: water absorption of 7 to 15%, frost resistance of 40 to 50 cycles, and compression strength of 170 to 300 $kg/cm^2$.

To provide for gypsum products being monolitic and sufficiently strong in the process of their strengthening, the heat treatment is carried out over a period of time necessary for dehydration of at least 90 to 95% by volume of the dihydrous gypsum in the molded products.

To ensure that end gypsum products feature a water absorption of 7 to 10%, subjected to molding is, according to the invention, ground dihydrous gypsum mixed with water, the weight water to dihydrous gypsum ratio being 0.04 to 0.15 or, better, 0.05 to 0.10.

To make gypsum products imitating marble, granite and other kinds of building stones, it is expedient, according to the invention, to mold dihydrous gypsum crushed to a grading fraction of 1 to 10 mm, constituting 40% by weight, and ground to a grading fraction with a specific grain surface of 1,700 to 1,800 cm$^2$/g, constituting 60% by weight.

To achieve denser structure, improved mechanical properties and higher frost resistance, products should preferably be molded by pressing at a specific pressure of at least 60 kg/cm$^2$.

These and other objects and advantages of the present invention will become more apparent from the following detailed description of specific embodiments thereof, illustrated by examples.

DETAILED DESCRIPTION OF THE INVENTION

In the proposed process, the raw material is natural gypsum stone-dihydrous gypsum $CaSO_4.2H_2O$, which is crushed, prior to use, in a jaw breaker or a hammer crusher to a specific grain surface of 100 to 200 cm$^2$/g. The particular value of the specific surface depends on the thickness of the end product; for example, in producing panels or tiles 15 to 30 mm thick, gypsum stone should preferably be ground to a specific surface of 600 to 900 cm$^2$/g, and the thinner the product, the greater the specific surface of the ground gypsum. Besides, in manufacturing gypsum products imitating marble, granite and other building stones, we recommend to use, as the starting material, a mixture or blend of dihydrous gypsum crushed to a grading fraction of 1 to 10 mm and to a fraction with a specific grain surface of up to 2,000 cm$^2$/g, Preferably, 40% by weight of the 1-10 mm fraction should be mixed or blended with 60% by weight of the fraction with a specific surface of 1,700 to 1,800 cm$^2$/g.

The natural dihydrous gypsum $CaSO_4.2H_2O$ crushed or ground to the required grain size is watered with mixing to obtain a mix with a weight water to dihydrous gypsum ratio of 0.04 to 0.15. The value of this ratio depends on the conditions of the subsequent molding and characteristics of the equipment to be used for this purpose; for example, when products are molded on two-step presses at a specific pressure of 75 to 250 kg/cm$^2$, the weight water to dyhydrous gypsum ratio must be 0.05-0.07. In addition, as has been mentioned above, to obtain gypsum products featuring a water absorption of 7 to 15%, the water to dihydrous gypsum ratio must be 0.05 to 0.1.

From the resulting mix products are molded, for instance, by pressing or by jolting. In the former case, the specific pressure must be at least 60 kg/cm$^2$. It has been experimentally established that if this condition is met, the products exhibit a denser structure and improved mechanical properties.

The molded gypsum products are then transferred to a heat treatment apparatus, such as a belt or tunnel kiln. In accordance with the present invention, the heat treatment is carried out in air. The temperature in the kiln is raised (from room temperature) at a rate of 2 to 3 degrees per minute to a level selected within the range of 100° to 200° C. The maximum heat treatment temperature and duration depend on the product thickness. For example, in the case of products 6 to 7 mm thick, the maximum temperature is 150° to 160° C. maintained over a period of time required and sufficient for dehydration of at least 90 to 95% by volume of the dihydrous gypsum in the molded products. As soon as this degree of dehydration is reached, the process is practically over, and keeping the products in the kiln longer is economically unreasonable. During the heat treatment, natural dihydrous gypsum $CaSO_4.2H_2O$ transforms to hemihydrate gypsum $CaSO_4.0.5H_2O$ with both mechanically combined and crystal water being released, and the initial crystallization structure is destroyed by recrystallization of the dihydrate into the hemihydrate. At a certain degree of compaction of the mix during molding, dihydrous gypsum particles break down to some extent in the process of heat treatment, which is promoted by the constant release of water, and the area of contact between individual particles increases. The subsequent strengthening of the products, taking place during watering, already involves the altered microstructure of a product; crystallization of dihydrous gypsum will contribute to higher strength and lower porosity of a product. Note that raising the heat treatment temperature above 200° C. is not expedient, for at temperatures above 200° C. anhydride formation is possible, which will adversely affect the strength and frost resistance of products.

After heat treatment, the products are cooled down to 40°-50° C. by any appropriate technique, e.g. by forced air blasting or by natural cooling. Then, the products are strengthened by watering to saturation, i.e. by using an amount of water required for crystallization of hemihydrate gypsum into dihydrous one, which is equal to about 18% by weight relative to the weight of a dried product. This step can be carried out by immersing the products into water, sprinkling water thereon, or saturating them with water steam.

As a result of saturation with water, hemihydrate gypsum $CaSO_4.0.5H_2O$ turns back to dihydrous gypsum $CaSO_4.2H_2O$ with recrystallization accompanied by formation of a strong structure.

Thereafter, the products are subjected to natural or forced drying with the result that they attain the final compression strength of 100 to 300 kg/cm$^2$.

If necessary, the end products may be ground, polished or have any other type of conventional surface finish.

The present invention provides for the possibility of introducing a dye, e.g. a mineral dye, into the starting mixture of dihydrous gypsum $CaSO_4.2H_2O$ with water, whereby one can obtain products of any color without affecting the process of their manufacture.

The precise process of making a gypsum product can be established by structural analysis thereof.

As can be inferred from the foregoing, the proposed process permits manufacturing a broad range of products from gypsum stone, with improved physicomechanical properties and applicable in various fields of construction.

For example, owing to the frost resistance of gypsum products thus made being 6 times higher than that of conventional gypsum products, they can be used for exterior facing of buildings and structures. In addition, molding by pressing enables making products of diverse configurations and obtaining an ornamentally designed face surface.

Moreover, the proposed process is waste-free and does not pollute the environment.

EXAMPLE 1

Natural gypsum stone is crushed in a jaw breaker, then ground in a ball mill to a specific grain surface of 1,000 cm²/g. The water content in the powder is 3%. The powder is mixed with water to obtain a weight water to gypsum ratio of 0.07, and the resulting mix is molded on a hydraulic press at a specific pressure of 150 kg/cm². The molded product is placed in a kiln for heat treatment during which the kiln temperature is raised to 160° C. at a rate of 2° C. per minute. At the attained temperature, the product is held for 1.5 hours, then cooled in air for 20 minutes down to 47° C. Thereafter, the product is watered to saturation by being immersed into a water bath, then dried in air.

The compression strength of the end product is 115 kg/cm², the frost resistance is 50 cycles, and the water absorption is 9%.

EXAMPLE 2

Natural gypsum stone is crushed in a jaw breaker, then partially ground in a ball mill to a specific surface of 1,700 cm²/g, the rest being crushed further in a hammer crusher to a grading fraction of 1 to 10 mm.

Thereafter, 40% by weight of gypsum of 1 to 10 mm grading fraction are mixed with 60% by weight of the gypsum powder with the specific surface of 1,700 cm²/g, and the resulting mix is watered to a weight water to gypsum ratio of 0.06. The mix is then molded on a press at a specific pressure of 170 kg/cm². The molded product is placed in a kiln wherein the temperature is raised to 180° C. at a rate of 2° C. per minute. The product is kept at this temperature for 2 hours with subsequent natural cooling for 30 minutes down to 43° C.

Then, the product is watered to saturation by sprinkling and dried in a drying oven at 50° C. for 3 hours.

The end product is ground on its face surface with a grinding wheeel.

The compression strength of the end product is 280 kg/cm², the frost resistance is 50 cycles, and the water absorption is 10%.

EXAMPLE 3

Natural gypsum stone is crushed in a jaw breaker, then partially ground in a ball mill to a specific surface of 2,000 cm²/g, while the rest is crushed further in a hammer crusher to a grading fraction of 1 to 7 mm.

Then, 40% by weight of the 1 to 7 mm grading fraction gypsum are mixed with 60% by weight of the ground gypsum with the specific surface of 2,000 cm²/g. The resulting mixture is molded on a press at a specific pressure of 200 kg/cm². The molded product is placed in a kiln where the temperature is raised (from room temperature) to 180° C. at a rate of 3° C. per minute. The product is kept at this temperature for an hour till a 90% by volume dehydration of the dihydrous gypsum in the molded product is attained. Thereafter, the product is cooled at room temperature for 30 minutes down to 40° C.

The cooled product is watered to saturation by sprinkling and dried in a drying oven at 50° C. for 3 hours.

The end product can have its face surface ground with a grinding wheel.

The compression strength of the end product is 240 kg/cm², and the frost resistance is 45 cycles.

EXAMPLE 4

Natural gypsum stone is crushed in a jaw breaker, then ground in a ball mill to a specific surface of 100 cm²/g and watered to a weight water to gypsum ratio of 0.05, whereafter it is molded on a press at a specific pressure of 280 kg/cm². The molded product is placed in a kiln where the temperature is raised to 140° C. at a rate of 2° C. per minute. The product is kept at this temperature for 1.5 hours with 95% by volume of the dihydrous gypsum being dehydrated.

The product is then cooled for 20 min under natural conditions down to 50° C. The surface of the product is sprinkled with water. The subsequent drying is carried out in oven at 50° C. for 3 hours.

The compression strength of the end product is 140 kg/cm², and the frost resistance is 40 cycles.

EXAMPLE 5

Gypsum stone with a natural water content of 5% is ground to a specific surface of 800 cm²/g and molded by pressing at a specific pressure of 300 kg/cm². The molded product is heated to a temperature of 160° C. at a rate of 2° C. per minute. The product is held at this temperature for two hours, and 92% by volume of the dihydrous gypsum are dehydrated. The product is then cooled naturally for 30 min down to 40° C.

The product is watered to saturation by immersion. The compression strength of the end product is 150 kg/cm², and the frost resistance is 45 cycles.

What is claimed is:

1. In a process of manufacturing gypsum products comprising crushing of natural dihydrous gypsum $CaSO_4.2H_2O$; molding of the crushed natural dihydrous gypsum; heat treating the molded products; cooling the heat-treated products; and treating the cooled products with water to strengthen the products, the improvement comprising: in the heat treatment, raising the temperature of the molded products from room temperature to a level within the range of 100° to 200° C. at a rate of 2 to 3 degrees per minute, and in the cooling step, cooling the products to a temperature not exceeding 50° C.

2. The process of claim 1 wherein the products are cooled to a temperature of from 40° to 50° C.

3. The process of claim 1 wherein the heat treatment is carried out over a period of time required for dehydration of at least 90 to 95% by volume of the dihydrous gypsum in the molded products.

4. The process of claim 1 wherein the crushed natural dihydrous gypsum is mixed with water prior to molding, the weight ratio of water to dihydrous gypsum being 0.05-0.1.

5. The process of claim 1 wherein the crushed natural dihydrous gypsum comprises a mixture of 40% by weight particles having a diameter of 1 to 10 mm and 60% by weight of particles having a specific grain surface of 1700 to 1800 cm²/gm.

6. The process of claim 1 wherein the crushed natural dihydrous gypsum is molded by pressing at a specific pressure of at least 60 kg/cm².

* * * * *